Feb. 13, 1945.　　　　C. G. ROPER　　　　2,369,179
WEIGHING CAPACITY EXHIBITOR
Filed July 23, 1942　　　3 Sheets-Sheet 1

INVENTOR
Charles G. Roper,
BY
ATTORNEY

Feb. 13, 1945.　　　　C. G. ROPER　　　　2,369,179
WEIGHING CAPACITY EXHIBITOR
Filed July 23, 1942　　　3 Sheets-Sheet 2
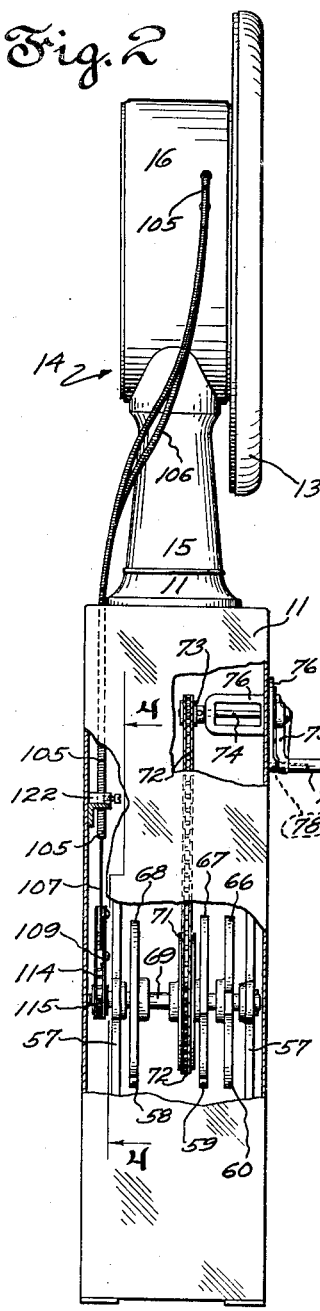
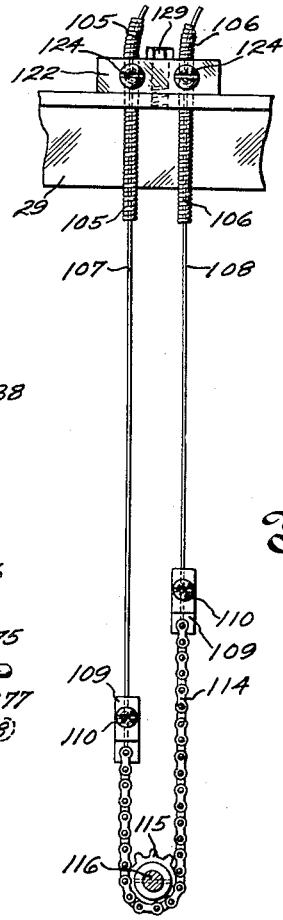
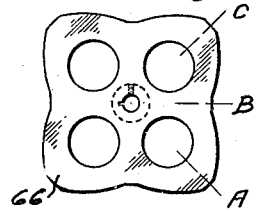
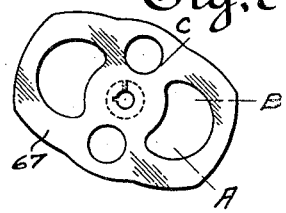
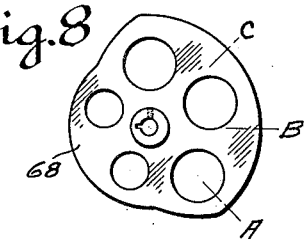
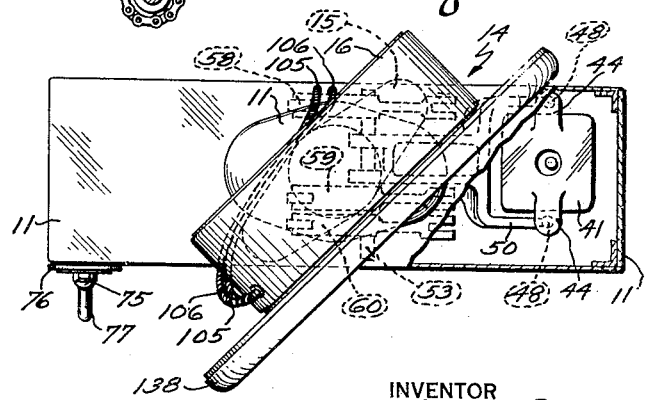
INVENTOR
Charles G. Roper,
BY
ATTORNEY

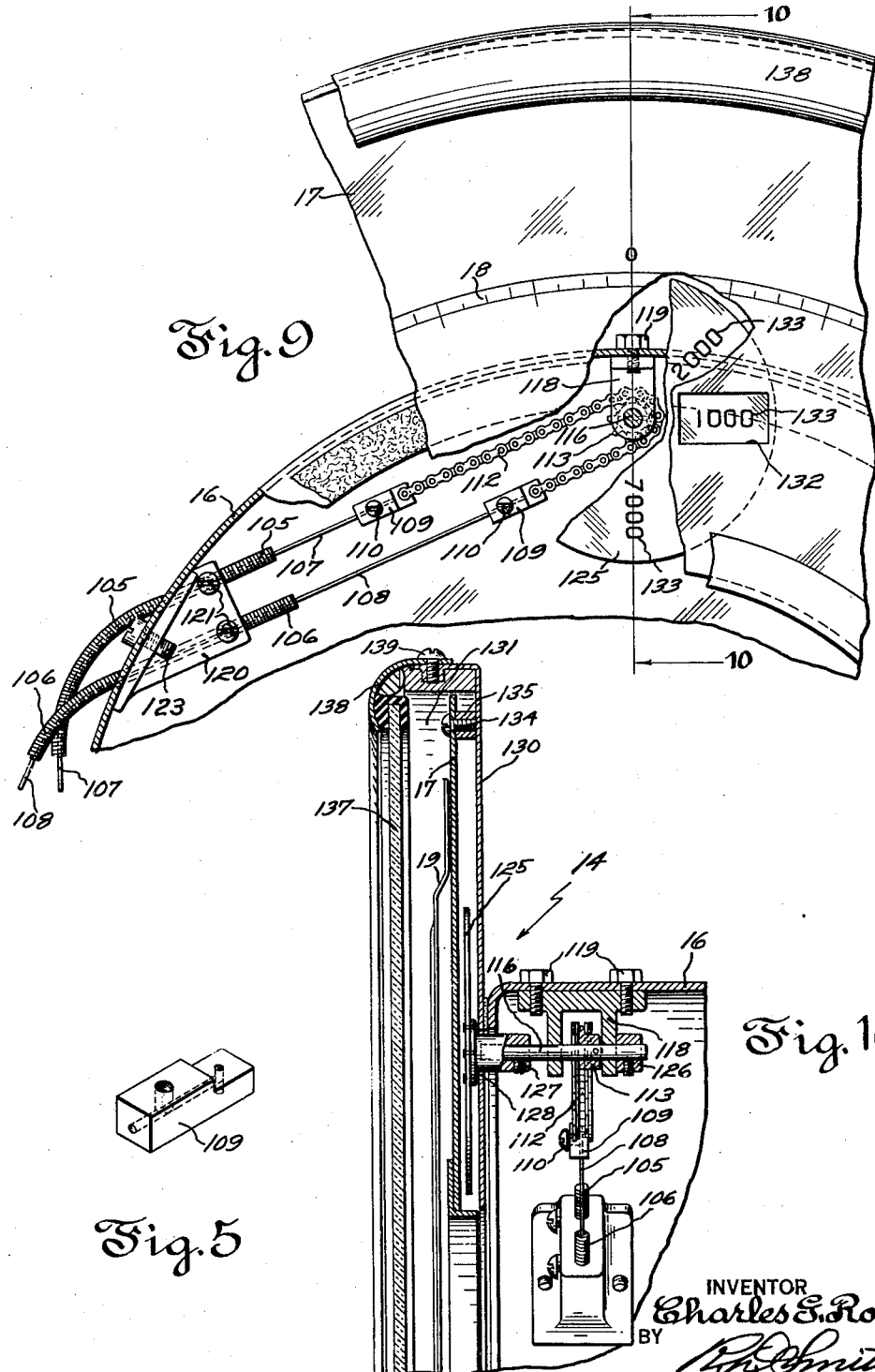

Patented Feb. 13, 1945

2,369,179

UNITED STATES PATENT OFFICE 2,369,179

WEIGHING CAPACITY EXHIBITOR

Charles G. Roper, Fairfield, Conn., assignor, by mesne assignments, to The Yale & Towne Manufacturing Company, Stamford, Conn., a corporation of Connecticut Application July 23, 1942, Serial No. 452,011

21 Claims. (Cl. 265—48)

This invention relates to apparatus for exhibiting changeable load counterbalancing effects occasioned in a weighing mechanism by depositing separate unit weights or different sets of such weights in operative association with some lever or linkage element in such mechanism. Such lever or element may constitute part of a tare beam structure such as is commonly associated with linkage connection between load container and load counterbalancing and weight indicating mechanism of an industrial weighing scale having a dial chart. Selectively placeable and withdrawable unit weights are used as a convenient and accurate means for adding to the normal weighing capacity of such automatic load counterbalancing mechanism in cases where loads may be encountered which exceed the normal weight indicating capacity of the dial chart. Unit weights so deposited become an operative factor in the weighing system requiring the application of heavier than normal loads in order to cause any displacement of the weight-indicating pointer from "no-load" or zero position on the dial. Apparatus herein disclosed for depositing, as well as withdrawing and withholding, preselected individual unit weights or preselected sets thereof is disclosed and claimed in a copending application Serial No. 451,381, filed July 18, 1942.

An object of the present improvements is to make known to an observer of the normal weight indication reading of a scale what abnormal or excess unit weight factor must be added to the normally indicated weight reading to give the true total weight of a load which exceeds the normal weighing capacity of the scale.

Another object is to exhibit by means of a shiftable annunciator what particular unit weight or set of unit weights is at any given time deposited and in operative association with the normal load counterbalancing mechanism.

A further object is to provide an excess capacity imparting annunciator which may indicate or exhibit progressively increasing values of weighing capacity corresponding to the withdrawal, as well as to the depositing, of certain unit weights.

A further object is to provide an annunciator which may advance by successive stages in a constant direction to exhibit progressively increasing weighing capacities occasioned by changes of unit weights involving the withdrawal as well as the depositing of certain unit weights.

An important object is to transmit motion with accuracy from a unit weight depositing and withdrawing apparatus stationed in the underlying hollow standard of a scale to a shiftable indicator carried by the swiveling dial head section of the scale in all of the various possible positions to which such head section can adjustably be turned relative to such stationary standard.

Another object is to transmit movement accurately and without lost motion from such an apparatus to such as exhibitor through connections involving a minimum number of parts, and by the use of parts of such nature that they require neither accurate dimensioning nor accurate pre-fitting before they are assembled and installed in the scale.

Still another object is to provide exhibiting mechanism in a form that may readily be installed in a scale not originally planned to carry such mechanism. To this end it is convenient that the mechanism to be so installed shall be external to the usual hollow joint that connects the register head section of the scale in swiveling relation to the frame section of the scale which supports it or if such mechanism be not external to such hollow joint that it at least be offset relatively to the fixed axis of head swiveling movement established by such joint so as to afford room for weight force transmitting means to move in such axis.

Related objects are to reduce much cost and time heretofore involved in making and installing in weighing scales exhibitors of excess weighing capacities or other data pertaining to changeable operating characteristics of the scale.

The foregoing and other objects will become clear in connection with the following description of an illustrative form of the invention, in which description reference is had to the accompanying drawings wherein:

Fig. 2 is a side view looking from the left at Fig. 1.

Fig. 3 is a plan view of the scale showing the dial head swiveled to oblique relationship to the underlying cabinet.

Fig. 4 is a fragmentary enlarged view taken in section on the plane 4—4 in Fig. 2 looking in the direction of the arrows.

Fig. 5 is an enlarged perspective view of a cable terminal chain connector.

Figs. 6, 7 and 8 are details of separate cams making up the bank of cams in Fig. 1.

Fig. 9 is an enlarged view of the exhibiting apparatus in the dial head whose location is shown by broken lines in Fig. 1.

Fig. 10 is a correspondingly enlarged view taken in section on the plane 10—10 in Fig. 9, looking in the direction of the arrows.

Figures 1, 11, 12:
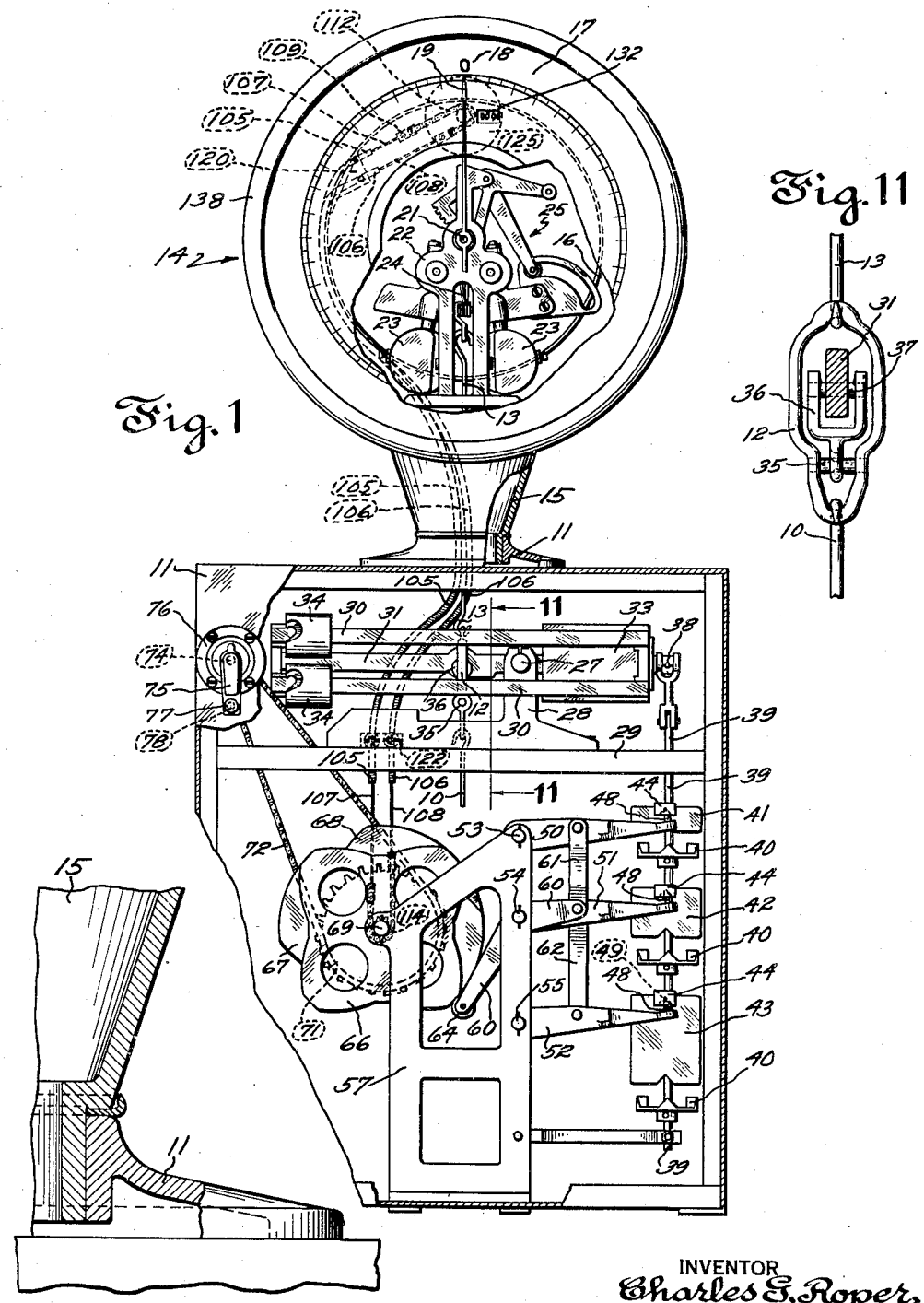
Fig. 1 is a front view of the support standard and dial head sections of an industrial weighing scale showing casing walls broken away to expose interior apparatus which includes the capacity change exhibiting mechanism of these improvements.
Fig. 11 is a fragmentary view taken in section on the plane 11—11 in Fig. 1 looking in the direction of the arrows.
Fig. 12 is an enlarged fragmentary view of a portion of the structure shown in Fig. 1.

In Fig. 1 a draft rod 10 is assumed to connect at its bottom end (not shown) with some lever system associated with the platform or other receptacle (not shown) for a weighable load. Such platform is commonly located at the base of a hollow standard, as the cabinet 11. The pull of the load is assumed to be downward on draft rod 10 whose top end is coupled to a loop 12. A connecting rod 13 runs upward from loop 12 to the dial head unit designated as a whole by 14.

The dial head unit may be like that fully disclosed in U. S. Patent No. 2,083,413 granted to G. E. Weist and may consist of a casing 16 perched to swivel about a vertical axis on the cabinet 11 by means of a hollow swivel joint formed by rotary bearing engagement of the hollow casing neck 15 with an annular bearing on cabinet 11. Casing 16 carries the dial chart 17 marked with weight designating indicia 18 swept by weight indicating pointer 19 rotatably carried on spindle 21. This pointer spindle is journaled in a frame 22 which also rotatably supports the load counterbalancing pendulums 23 that are caused to swing upward and outward responsive to the downward pull of connecting rod 13 on flexible ribbons 24 in a manner that will be clear from the disclosure in the aforesaid patent wherein there also is fully illustrated and described the mechanism 25 that transmits movement from pendulums 23 to the pointer spindle 21. In scales of this type in order to preclude dust and dirt from entering casing 16 the hollow casing neck 15 is commonly filled at the swivel joint with means to hermetically seal off the interior of casing 16 from the lower interior of cabinet 11. Hence there is room for only the connecting rod 13 to pass through such neck.

Within cabinet 11 there is fulcrumed at 27 on a stand 28 which is mounted on cross bar 29 fixed to the cabinet walls, a rocking tare beam structure consisting of one or more graduated beams 30 fixedly united with a lever 31 shown at the rear of the beams 30 in Fig. 1. Such tare beam structure commonly includes a ballast compartment 33 and also poises 34 slidably carried on the beams. Lever 31 is pivotally mounted on the fulcrum 27 and is straddled by the aforementioned loop 12 as best shown in Fig. 11. This loop contains a cross pin 35 having a grooved periphery engaged by the rounded bottom turn of a stirrup 36 whose yoke arms rest on a knife edge 37 fixed in lever 31. In this manner the beam or balance structure is operatively associated with the load counterbalancing mechanism before described.

Suspended pivotally from the right extremity of the tare beam structure at 38 there is a depending rod 39. At different height levels along this rod are fixed shelf-like rosettes 40 which are adapted to serve as receivers for at times supporting unit weights 41, 42 and 43. Each of these unit weights has a central vertical bore considerably larger than the rod 39 that passes through it. Each unit weight also carries forward and rearward protruding lugs 44 in each of whose bottom surface there is formed a socket 49 receptive to the upstanding rounded end of a lifter post 48 fixedly carried at the end of each of the lifter arms 50, 51 and 52. Sockets 49 may be conical.

Three shafts 53, 54 and 55 journaled in a frame 57 that is fixed to cabinet 11 respectively carry the lifter arms 50, 51 and 52, one above another, and shaft 54 also serves as pivotal support for three cam followers, one in front of another, like 60 in Fig. 1. The middle one 59 of these followers is pinned to and turns in unison with lifter arm 51, the rear follower 58 is connected to lifter arm 50 by a push link 61, while the front follower 60 is connected to lifter arm 52 by a pull link 62.

Each of followers 58, 59 and 60 consists of a bell crank having a hub freely rotatable on shaft 54 and carrying at its bottom extremity a freely turnable roller wheel 64 which rides against the edge of one of the cams of a bank of cams 66, 67 and 68, all of which are carried by and fixed to rotate in unison with the shaft 69 journaled in frame 57. Also fixed upon shaft 69 is a sprocket wheel 71 impellably engaged by a chain belt 72 which is driven by another sprocket wheel 73 fixed on the inner extremity of the stud shaft 74 to which is fixed a crank 75. The ratio of these sprocket wheels is 1 to 8.

Shaft 74 is journaled in a bearing block 76 which is lodged in the front wall of cabinet 11 and contains a detent opening into which a detent plug 78 carried by the rear end of crank handle 77 may be inserted. Thus crank 75 may be locked against rotation. Handle 77, itself, is slidable endwise relative to crank arm 75 for this purpose.

The capacity change exhibiting devices in which are incorporated the present improvements are usable in conjunction with the dial chart 17 and weight indicating pointer 19 of the above described automatic load counterbalancing scale for causing to appear within the view of an observer of the adjustably swiveling dial head 14 desired informative data, whether or not related to changes in weighing capacity, that may arise from or pertain to mechanical action or conditioning of apparatus located in the underlying stationary standard 11. It is desired that the dial head section shall be able to swivel adjustably about a vertical axis without disturbing the accuracy of operating motion transmitted to the exhibitor and for this purpose translating mechanism must be employed which remains in stationary relationship at one end to the underlying frame standard and which trails the swiveling dial head section at its other end so that the translating mechanism need not pass through the hollow neck 15 at the bottom or swivel jointed end of the latter. It is desirable for some purposes that this translating mechanism be in externally offset relation to the hollow swivel joint 15—11, as to facilitate installation in a scale originally made without provision for the transmission mechanism of these improvements, and it is advantageous in any event that the translating mechanism be offset relatively to the fixed axis about which the weight indicating head is rotatable relatively to the main supporting frame. Such translating mechanism is herein employed in the form of flexible mechanism which may take the form of separate flexible hollow conduits 105 and 106 whose walls may consist of a continuous length of helically coiled resilient round wire close wound on a forming mandrel of size to produce an inside conduit diameter of, say, .071". Through such conduits there pass freely slidable separate pull cables 107 and 108, respectively, each cable consisting of a single strand of piano wire, say, .040" in diameter and preferably having a high degree of resilience and flexibility. Whatever form of flexible mechanism is employed should extend from cabinet 11 outside of and alongside of head casing 14 for a sufficient portion of its flexible length to trail the swiveling movements of the head casing.

Each end of each wire cable wire is equipped with a hinge-affording coupling block 109, best shown in Fig. 5, which receives and is made fast to its cable wire by a set screw 110. Each hinge block has pivotally connected to it the terminal link of a belt chain. The belt chain 112 in the dial head section loops around and impellingly engages with the teeth of a sprocket wheel 113. The belt chain 114 in the underlying support standard loops around and impellably engages with the teeth of a sprocket wheel 115 of like size. In a functional sense the assembled wire cables and belt chains constitute and may appropriately be referred to as an endless belt.

Sprocket wheel 115 is fixedly mounted on the rear end of the cam shaft 69 which is reduced in diameter for this purpose. Sprocket wheel 113 is fixedly mounted on a spindle 116 which is journaled in a bearing bracket 118 secured to the casing 16 of the dial head section by bolts 119.

The upper end of each of conduits 105 and 106 is adjustably lodged in a separate close fitting hole through anchorage block 120 by means of a set screw 121. This block is fixedly mounted against the inner surface of the dial head casing 16 by means of bolts 123. The lower end of each of conduits 105 and 106 is adjustably lodged in a separate close fitting hole through anchorage block 122 by means of a set screw 124. Block 122 is fixedly mounted on the top surface of cross bar 29 of the frame by means of bolts 129. In the manner described the end portions of both conduits are held so as to be directed in straight-away tangential alignment with the peripheries of sprocket wheels 113 and 115 so that cable wires 107 and 108 will slide smoothly and freely in and out of the open ends of the conduits. When installing these conduits and cables, the latter may first be coupled to the sprocket engaging chain belts 112 and 114 while set screws 121 and 124 are loose. This permits the conduits to be adjusted lengthwise of their anchorage holes in blocks 120 and 122 until the lengths of these conduits between the anchorage blocks equals the corresponding lengths of cable 107 and 108 after which set screws 121 and 124 may be tightened and hold the conduit ends in fixed relation to their anchorage blocks. Whatever relative movement thereafter takes place between the anchorage blocks 120 and 122 will be followed freely by the somewhat loose connecting lengths of conduit and cable wire in a manner not to occasion any lengthwise relative movement between either cable and its conduit.

Spindle 116, as is best known in Fig. 10, carries fixed on its front end a signal disc 125 and its rear end carries a thrust collar 126. The hub 127 of disc 125 passes through an aperture 128 in the back wall 130 of the shallow annular compartment 131 which contains the dial chart 17. This chart is removably secured to wall 130 by screws 134 which thread into spacer studs 135 welded to wall 130. Chart 17 may be covered and protected as usual by glass 137 held removably in front of the chart by a bezel 138 secured to 130 by screws 139. The chart contains a rectangular window opening 132 exposing only a portion of signal disc 125 therethrough which carries one of the numerals 133 or other desired markings informative of changes that are brought about in the weighing capacity of the scale.

As an example of operation, it may be assumed that the normal weighing capacity of the scale with all unit weights removed as in Fig. 1 may be 1000 lbs. Each follower wheel 64 bears on its cam at the peripheral point designated A in Figs. 6, 7 and 8. A load of 1500 lbs. is to be weighed. Handle 77 will be pulled forward and crank 75 thus freed so that it can be turned one complete revolution, whereupon plug 78 will again enter and interlock with its detent socket in the face plate of bearing bracket 76. All of cams 66, 67 and 68 have thereby been rotated one-eighth of a complete revolution clockwise and each follower wheel 64 thereupon rests against the spot B on the cam which it follows. See Figs. 6, 7 and 8. Only the top unit weight 41 is thereby let into operation, the other two unit weights 42 and 43 remaining held out of operation or in lifted position by cams 67 and 68 respectively. As a result, 1000 pounds of the total 1500 pounds of the load weight will result in no movement of pointer 19 away from zero. This excess capacity condition is indicated by the indicium "1000" which signal disc 125 will now exhibit in window 132 as shown in Fig. 9. 500 pounds of the total load weight therefore remains to be counterbalanced by the lifting action of pendulums 23. Action of the latter will swing pointer 19 into register with the indicium "500" on the dial chart 17. The operator will now add to this registered "500" pounds the "1000" pounds counterbalancing effect of the unit weight 41 which is registered in window 132 and thereby know that the total load weight is 1500 pounds.

For each successive one-eighth turn of the cam shaft 69 in either rotative direction an exactly equal degree of turning in corresponding direction will be imparted to the signal disc 125 by the pulling action of either cable 107 or 108 through the instrumentality of the sprocket wheels 115 and 113 engaged by the chain belts 114 and 112, respectively. This transmission of rotary movement from one sprocket wheel to the other takes place without the presence of lost motion and with equal accuracy irrespective of the adjusted angle of dial head section 14 and its casing 16 relative to frame standard 11. Sufficient play is afforded by the flexibility of conduit 105 and 106 to permit this swiveling of the dial head section away from its position shown in Figs. 1 and 2 to any other desired position such, for example, as that shown in Fig. 3. At the same time the interior of hollow casing neck 15 is not interfered with by conduits 105 and 106 and therefore is left available to be filled at its swivel joint with structure which may serve as a seal to preclude entrance of dirt from cabinet 11 into dial head casing 16.

As there are obvious substitutions for the particular shapes and arrangement of parts herein disclosed, the appended claims will be understood as referring and directed to all substitutes and equivalents of the disclosed parts and arrangements which fairly come within their terms.

I claim:

1. In a weighing scale including an adjustably movable section connected in swiveling relationship to a stationary frame section, the combination with said scale sections, of weight indicating mechanism carried by said movable section, apparatus supported by said frame section operatively associated with said mechanism, a signal device carried by said movable section shiftable to different positions for exhibiting differing data informative of operative changes in said apparatus, a flexible cable operatively connecting said apparatus and signal device, and guideways attached respectively to said sections at different points along said cable slidably fitted by the latter in a manner to direct said cable into different paths of lengthwise movement corresponding to different swiveled relationships of said sections.

2. In a weighing scale including an adjustably movable section connected in swiveling relationship to a stationary frame section, the combination with said scale sections, of weight indicating mechanism carried by said movable section, apparatus supported by said frame section operatively associated with said mechanism, a signal device carried by said movable section shiftable to different positions for exhibiting differing data informative of operative changes in said apparatus, a flexible cable operatively connecting said apparatus and signal device, and a hollow flexible conduit connected at its opposite ends to said scale sections respectively and sleeving said cable in a manner to direct the latter into paths of movement differing in accordance with different swiveled relationships of said sections.

3. In a weighing scale including an adjustably movable section connected to a stationary frame section in a manner to swivel relative to the latter, the combination with said scale sections, of weight indicating mechanism carried by said movable section, apparatus supported by said frame section operatively associated with said mechanism, a signal device carried by said movable section shiftable to different positions for exhibiting differing data informative of operative changes in said apparatus, two flexible cables cooperatively connecting said apparatus and signal device, and guideways through which said cables are free to slide attached respectively to said sections.

4. In a weighing scale including an adjustably movable section connected in swiveling relationship to a stationary frame section, the combination with said scale sections, of weight indicating mechanism carried by said movable section, rotary apparatus supported by said frame section operatively associated with said mechanism, a rotary signal device carried by said movable section shiftable to different positions for exhibiting differing data informative of operative changes in said apparatus, a wheel mounted on said movable section to turn with said signal device, a wheel mounted on said frame section to turn with said apparatus, and a belt impellingly engaging the first said wheel and impellably engaged by the other said wheel, together with guide means attached respectively to said sections arranged to direct said belt into variable paths of lengthwise movement between said wheels corresponding with various swiveled relationships of said sections.

5. In a weighing scale including an adjustably movable section connected in swiveling relationship to a stationary frame section, the combination with said scale sections, of weight indicating mechanism carried by said movable section, apparatus supported by said frame section operatively associated with said mechanism, a signal device carried by said movable section shiftable to different positions for exhibiting differing data informative of operative changes in said apparatus, two flexible cables cooperatively connecting said apparatus and signal device, and two hollow flexible conduits each connected at its opposite ends to said scale sections respectively and sleeving a different one of said cables in a manner to direct said cables into paths of lengthwise movement differing in accordance with different swiveled relationships of said sections.

6. In a weighing scale including an adjustably movable section connected to a stationary frame section in a manner to swivel relative to the latter, the combination with said scale sections, of weight indicating mechanism carried by said movable section, rotary apparatus supported by said frame section operatively associated with said mechanism, a rotary signal device carried by said movable section shiftable to different positions for exhibiting differing data informative of operative changes in said apparatus, a wheel mounted to turn with said signal device, a wheel mounted to turn with said apparatus, an endless belt impellingly engaging the first said wheel and impellably engaged by the other said wheel, and two side by side hollow flexible conduits each connected at its opposite ends to said scale sections respectively and each guidingly sleeving a different stretch of said belt.

7. In a weighing scale including an adjustably movable section connected to a stationary frame section in a manner to swivel relative to the latter, the combination with said scale sections, of weight indicating mechanism carried by said movable section, apparatus supported by said frame section operatively associated with said mechanism, a signal device carried by said movable section shiftable to different positions for exhibiting differing data informative of operative changes in said apparatus, a flexible cable operatively connecting said apparatus and signal device, a hollow flexible conduit connected at its opposite ends to said scale sections respectively and guidingly sleeving said cable, means fixedly securing one end portion of said conduit to said movable scale section, and means fixedly securing the other end portion of said conduit to said stationary scale section.

8. In a weighing scale including an adjustably movable section connected to a stationary frame section in a manner to swivel relative to the latter, the combination with said scale sections, of weight indicating mechanism carried by said movable section, rotary apparatus supported by said frame section operatively associated with said mechanism, a rotary signal device carried by said movable section shiftable to different positions for exhibiting differing data informative of operative changes in said apparatus, a wheel mounted to turn with said signal device, a wheel mounted to turn with said apparatus, an endless belt impellingly engaging the first said wheel and impellably engaged by the other said wheel, two side by side hollow flexible conduits each connected at its opposite ends to said scale sections respectively and guidingly sleeving a different stretch of said belt, means fixedly securing neighboring end portions of each of said conduits to said movable scale section, and means fixedly securing the neighboring portions of the opposite ends of said conduits to said stationary scale section.

9. In a weighing scale including an adjustably movable section connected to a stationary frame section in a manner to swivel relative to the latter, the combination with said scale sections of, weight indicating mechanism carried by said movable section, rotary apparatus supported by said frame section operatively associated with said mechanism, a rotary signal device carried by said movable section shiftable to different positions for exhibiting differing data informative of operative changes in said apparatus, a sprocket wheel rotatably associated with said signal device mounted on said movable section to rotate in variously directed planes, a sprocket wheel rotatably associated with said apparatus mounted on said frame section to rotate in a fixed plane, and a composite endless belt for transmitting motion from one to the other of said sprocket wheels including a stretch of link chain looped about and impellingly engaging the first said wheel constructed to flex only in the plane of rotation thereof, another stretch of link chain looped about and impellably engaged by the other said wheel constructed to flex only in the plane of rotation thereof, and separate side-by-side stretches of round wire flexible in variously directed planes coupling together said stretches of link chain to complete said endless belt, together with means engaging at least one of said round wires at a point between said link chains in a manner to divert said wire from a straight path of travel and away from at least one of said planes.

10. In a weighing scale including an adjustably movable section connected to a stationary frame section in a manner to swivel relative to the latter, the combination with said scale sections, of weight indicating mechanism carried by said movable section, rotary apparatus supported by said frame section operatively associated with said mechanism, a rotary signal device carried by said movable section shiftable to different positions for exhibiting differing data informative of operative changes in said apparatus, a wheel mounted to turn with said signal device, a wheel mounted to turn with said apparatus, an endless belt impellingly engaging the first said wheel and impellably engaged by the other said wheel, and two side by side hollow flexible conduits guidingly sleeving respectively separate stretches of said belt, each of said conduits being fixedly secured at each of its ends to direct each open end of each conduit in tangential relation to one of said wheels.

11. In a weighing scale including an adjustably movable section connected in swiveling relationship to a stationary frame section, the combination with said scale sections, of weight indicating mechanism carried by said movable section, apparatus in said frame section operatively associated with said mechanism, a signal device carried by said movable section shiftable to different positions for exhibiting differing data informative of operative changes in said apparatus, a flexible cable cooperatively connecting said apparatus and signal device in a manner to transmit to said signal device a pulling force originating in said apparatus urging said device to shift in one direction, and another flexible cable cooperatively connecting said apparatus and signal device in a manner to transmit to said signal device a pulling force originating in said apparatus urging said device to shift in the opposite direction, together with guide means attached respectively to said sections arranged to direct both of said cables into variable paths of lengthwise movement corresponding with various swiveled relationships of said sections.

12. In a weighing scale including an adjustably movable section connected to a stationary frame section in a manner to swivel relative to the latter, the combination with said scale sections, of load counterbalancing and weight indicating mechanism carried by said movable section, unit weight applying apparatus in said frame section operatively associated with said mechanism in a manner to vary the weighing capacity of said scale, a signal device carried by said movable section shiftable to different positions for exhibiting differing data informative of a change in the weighing capacity of the scale effected by said unit weight, at least one hollow flexible conduit connected at its opposite ends to said scale sections respectively, and at least one pull cable slidable lengthwise through said conduit and guided thereby in a path determined by the position of said conduit and connected to transmit movement from said apparatus to said signal device.

13. In a weighing scale including an adjustably movable section connected to a stationary frame section in a manner to swivel relative to the latter, the combination with said scale sections, of load counterbalancing and weight indicating mechanism carried by said movable section, unit weight applying apparatus including a weight lifting cam in said frame section operatively associated with said mechanism in a manner to vary the weighing capacity of said scale, a signal device carried by said movable section shiftable to different positions for exhibiting differing data informative of a change in the weighing capacity of the scale effected by said unit weight, at least one hollow flexible conduit connected at its opposite ends to said scale sections respectively, and at least one pull cable slidable lengthwise through said conduit and guided thereby in a path determined by the position of said conduit and connected to impart movement to said signal device in accordance with movements of said weight lifting cam.

14. In a weighing scale including an adjustably movable section connected to a stationary frame section in a manner to swivel relative to the latter, the combination with said scale sections, of load counterbalancing and weight indicating mechanism carried by said movable section, unit weight applying apparatus in said frame section operatively associated with said mechanism in a manner to vary the weighing capacity of said scale including a rotary unit composed of a weight lifting cam and a wheel, a signal device carried by said movable section shiftable to different positions for exhibiting differing data informative of a change in the weighing capacity of the scale effected by said unit weight, at least one hollow flexible conduit connected at its opposite ends to said scale sections respectively, at least one pull wire slidable lengthwise through said conduit and guided thereby in a path determined by the position of said conduit and connected to impart movements to said signal device, and a belt-like coupling connecting said pull wire to said wheel.

15. In a weighing scale including an adjustably movable section connected to a stationary frame section in a manner to swivel relative to the latter, the combination with said scale sections, of load counterbalancing and weight indicating mechanism carried by said movable section, unit weight applying apparatus including a unit weight lifting cam and cam shaft journaled in said frame section operatively associated with said mechanism in a manner to vary the weighing capacity of said scale, a sprocket wheel on said cam shaft, a signal device carried by said movable section shiftable to different positions for exhibiting differing data informative of a change in the weighing capacity of the scale effected by said unit weight, at least one hollow flexible conduit connected at its opposite ends to said scale sections respectively, at least one pull wire slidable lengthwise through said conduit and guided thereby in a path determined by the position of said conduit and connected to impart movements to said signal device, and a chain belt impellingly engaged by said sprocket wheel and connected to said pull wire for actuating the latter.

16. In a weighing scale including an adjustably movable section connected to a stationary frame section in a manner to swivel relative to the latter, the combination with said scale sections, of load counterbalancing and weight indicating mechanism carried by said movable section, unit weight applying apparatus including a unit weight lifting cam and cam shaft journaled in said frame section operatively associated with said mechanism in a manner to vary the weighing capacity of said scale, a sprocket wheel on said cam shaft, a signal device carried by said movable section shiftable to different positions for exhibiting differing data informative of a change in the weighing capacity of the scale effected by said unit weight, two round pull wires each extending from one to the other of said sections and connected to impart movements to said signal device, a chain belt impellingly engaged by said sprocket wheel and connected to both of said pull wires for actuating the latter, and means engaging at least one of said round wires at a point between said chain belt and said signal device in a manner to divert said wire from a straight path of travel.

17. In a weighing scale including an adjustably movable section connected to a stationary frame section in a manner to swivel relative to the latter, the combination with said scale sections, of load counterbalancing and weight indicating mechanism carried by said movable section, unit weight applying apparatus including a unit weight lifting cam and cam shaft journaled in said frame section operatively associated with said mechanism in a manner to vary the weighing capacity of said scale, a sprocket wheel on said cam shaft, a signal device carried by said movable section shiftable to different positions for exhibiting differing data informative of a change in the weighing capacity of the scale effected by said unit weight, two hollow flexible conduits each connected at its opposite ends to said scale sections respectively, two pull wires slidable lengthwise respectively through said conduits and guided respectively thereby in paths determined by the positions of said conduits and connected to impart movements to said signal device, and a chain belt impellingly engaged by said sprocket wheel and connected to both of said pull wires for actuating the latter.

18. In a weighing scale including an upright hollow stanchion-like head section supported by an underlying stationary frame section in a manner to swivel about a central vertical axis relative to the latter, the combination with said scale sections, of load counterbalancing and weight indicating mechanism carried in an upper portion of said stanchion-like section, unit weight applying apparatus beneath said head section in said frame section, connections extending from said frame section into said head section operatively associating said apparatus and said mechanism in a manner to vary the weighing capacity of the scale, a signal device carried within said head section shiftable to different positions for exhibiting differing data informative of a change in the weighing capacity of the scale effected by said unit weight, at least one hollow flexible conduit extending from said frame section upward along and outside of said head section and entering said upper portion of the head section, and at least one pull cable slidable lengthwise through said conduit and connected to transmit movement from said apparatus to said signal device.

19. In a weighing scale including an upright hollow stanchion-like head section supported by an underlying stationary frame section in a manner to swivel about a central vertical axis relative to the latter, the combination with said scale sections, of load counterbalancing and weight indicating mechanism carried in an upper portion of said stanchion-like section, unit weight applying apparatus beneath said head section in said frame section, connections extending from said frame section into said head section operatively associating said apparatus and said mechanism in a manner to vary the weighing capacity of said scale, a signal device carried within said head section shiftable to different positions for exhibiting differing data informative of a change in the weighing capacity of the scale effected by said unit weight, two hollow flexible conduits extending from said frame section upward along and outside of said head section and entering said upper portion of the head section, and at least one pull cable slidable lengthwise through each of said conduits and connected to transmit movement from said apparatus to said signal device.

20. In a load weighing scale, the combination of, a stationary frame structure, a bodily adjustable unit turnable in relation to said frame structure, a load weight indicator pivotal on an axis carried by said unit, load weight receiving apparatus on said stationary frame structure, connections operatively relating said apparatus to said weight indicating mechanism, means on said frame structure for variably conditioning said apparatus to perform differently in response to a constant load weight, a signal device carried by said adjustably turnable unit shiftable to different positions for exhibiting different data informative of the varied conditioning of said apparatus, an endless flexible cable operatively connecting said apparatus and signal composed of parallel strands running from said apparatus to said signal through paths displaced from said axis on a common side thereof, and means guiding said cable lengthwise attached respectively to said stationary frame structure and to said relatively turnable unit.

21. In a weighing scale including an adjustably movable section joined in swiveling relationship to a stationary frame section, the combination with said scale sections, of weight indicating mechanism carried by said movable section, apparatus supported by said frame section operatively associated with said mechanism, a signal device carried by said movable section shiftable to different positions for exhibiting differing data informative of operative changes in said apparatus, at least one flexible conduit connected at its opposite ends to said scale sections extending along the outside of said movable scale section with sufficient freedom of movement to trail the latter, and force transmitting means within said conduit arranged to transmit power from said apparatus to said signal device.

CHARLES G. ROPER.